Aug. 26, 1969   D. LABINO   3,463,624
METHOD OF MANUFACTURING GLASS PAPERWEIGHTS
Filed June 27, 1967   2 Sheets-Sheet 1

INVENTOR.
DOMINICK LABINO
BY
Pinan, Wilson & Praser
ATTORNEYS

Aug. 26, 1969 D. LABINO 3,463,624
METHOD OF MANUFACTURING GLASS PAPERWEIGHTS
Filed June 27, 1967 2 Sheets-Sheet 2
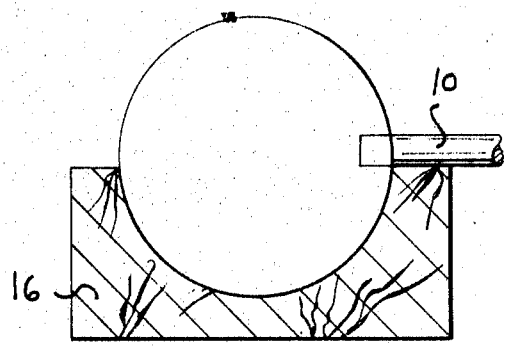
FIG 8
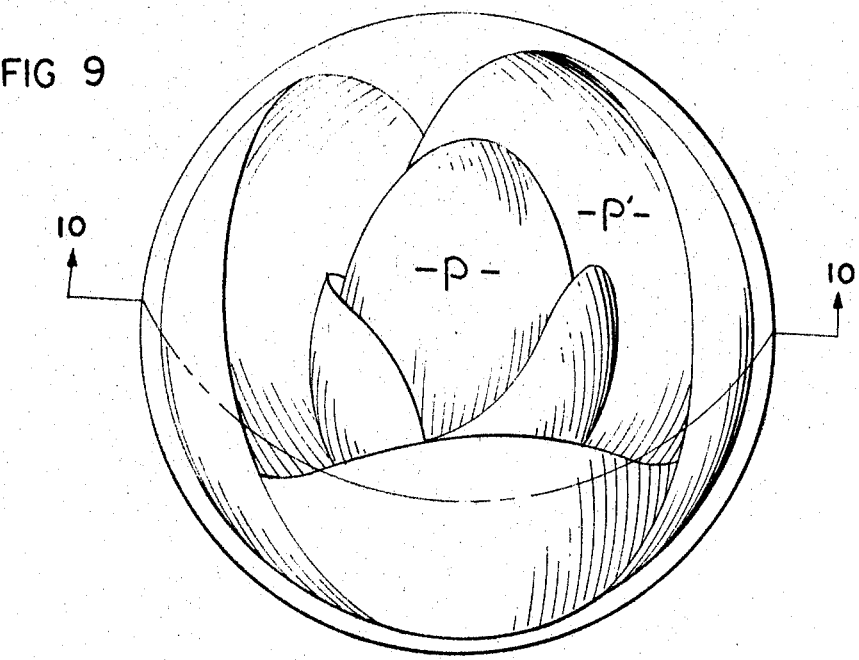
FIG 9
FIG 10
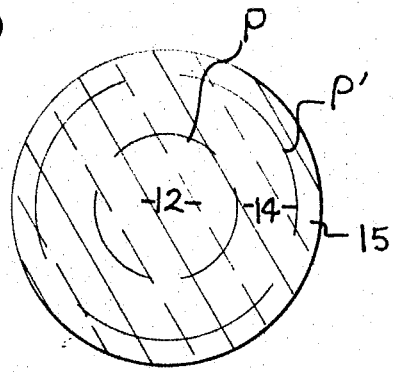
INVENTOR.
DOMINICK LABINO
BY
Pinner, Wilson, & Pinner
ATTORNEYS United States Patent Office 3,463,624
Patented Aug. 26, 1969

3,463,624
METHOD OF MANUFACTURING GLASS PAPERWEIGHTS
Dominick Labino, Kellog Road, Box 154,
Grand Rapids, Ohio 43522
Filed June 27, 1967, Ser. No. 649,197
Int. Cl. C03b 19/00; C03c 17/02
U.S. Cl. 65—71                                2 Claims

ABSTRACT OF THE DISCLOSURE

A method of manufacturing a glass paperweight, or the like, in which, after a gob of clear colorless glass has been gathered from the furnace and formed into an elongate cone, the pointed end portion is dipped into a bath of molten colored glass of higher temperature than the gob at an inclined angle recurrently after turning the cone to collect a thin coating of generally oblate form so that a plurality of coatings are formed about the cone representing petals of a flower, such for example, as a tulip. Then the cone is immersed into the molten clear glass so that the colored petals are arranged between two portions of layers of clear glass. The operation is repeated so as to form another row of colored petals and then redipped into the clear glass for a complete coating of clear glass.

BACKGROUND OF THE INVENTION

In the art of making glass paperweights, decorations such as flowers, leaves and stems are usually forced into the hot, soft mass of glass by inserting preformed creations. Often times, a mold known as a crimp is used to make the flower forms from glass having the desired colors, and these flower forms or designs, are pressed into the gob of glass in its relatively soft state and before the spherical shape is effected. Although these have esthetic appeal, it is not possible to produce leaves or petals of fine and delicate form closely resembling those of nature.

SUMMARY

According to this invention the paperweight has a homogeneous mass of glass in which several rows of petals of different sizes and shapes are formed, one appearing outside of the other and, if desired, those in one row differing in size, shape and overlaping relation to those in another row. For example, a red tulip can be formed where the rows of petals are generally concentric and still with the irregularity seen in nature. As a final touch, as by a slender piercing tool a stem and stamen or other artistic or nature-like touches may be added. The process lends itself to fairly rapid work, much more so than is the case of previous ways of forming paperweights of this character.

An object is to produce a novel method of making a glass paperweight or the like in which successive rows of colored petals are formed successively between layers of clear glass after which, the finished spherical shape is achieved.

BRIEF DESCRIPTION OF THE DRAWINGS

FIGURE 8 is a view partly in section showing the final forming step of shaping the sphere;

FIGURE 9 is a top elevation of the paperweight; and

FIGURE 10 is a schematic section taken on a reduced scale showing the petal arrangement.

DESCRIPTION OF THE PREFERRED EMBODIMENT

Figure 1:
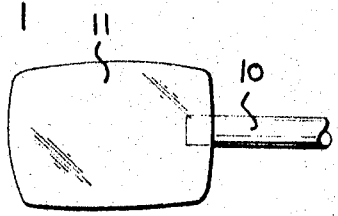
FIGURE 1 is a diagrammatic view of a portion of a pontil rod having a gathering of clear glass on the end portion.
Figure 2:
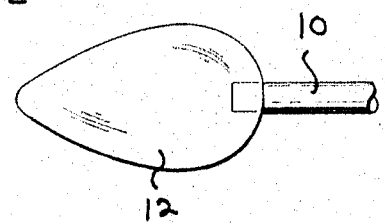
FIGURE 2 is a diagrammatic view of the second step in which the gob of glass is formed into a pointed cone.
Figure 3:
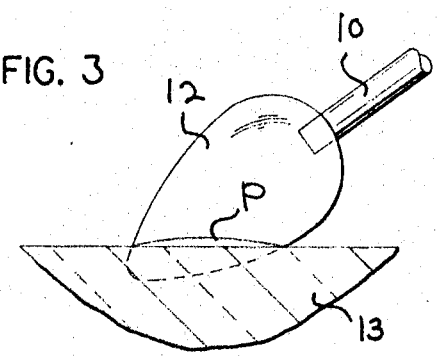
FIGURE 3 is a diagrammatic view of the next step in which the hot glass cone is dipped at an inclined angle into a bath of molten colored glass.
Figure 4:
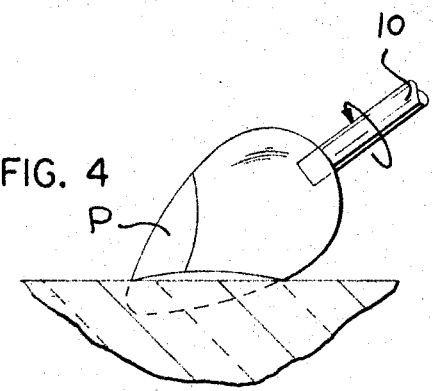
FIGURE 4 is a diagrammatic view similar to FIGURE 3 showing that after one petal has been formed, the rod is turned and a redip into the colored glass is made to form another petal.

Referring to the drawings, the artisan will first take the pontil rod 10 and immerse it into a furnace containing molten clear glass and gather a gob 11 on the end portion thereof. Then in a well-known manner, the gob is shaped to generally pointed conical form 12, as indicated in FIG. 2. In this connection, only a relatively small gob of glass is gathered and not a sufficient amount to achieve the final desired size. Thereafter the cone 12 is lightly dipped at its pointed end portion into a bath of molten colored glass 13. Any desired color may be given to this glass by means well known in the art. It should be observed that only the pointed end portion is immersed and as a result, this collects on the outer surface of the cone a petal-like form P. The cone 12 is repeatedly immersed, each time the cone 12 being turned as indicated on FIGURE 4, so that the next succeeding petal-like form P will be separate from, or slightly in overlapping relation to the first or previously formed petal. In the event three petals are desired, the cone will have been turned through an arc of 120°. For example, this would simulate one row, or set, of petals of a tulip so that finally, there would be an annular row of petals formed on the pointed end portion of the cone. The temperature of the colored glass 13 should be somewhat greater than that of the clear glass. For example, the clear glass batch may be of the order of 1950° F., plus or minus 50°, and the color batch would be 2000° F., plus or minus 50°. By having the color batch somewhat hotter than the clear batch, the thickness of the petal-like forms P, will be reduced, only a relatively thin layer being desired for this purpose. The angularity of the rod 20 to the surface of the batch at the time of the petal-like forms are applied would be of the order of 30°.

Figure 5:
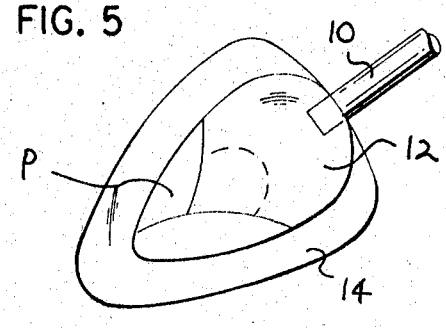
FIGURE 5 is a diagrammatic view showing that in the next step the cone is immersed into the clear glass to add a clear glass layer over the previously formed petals.
Figure 6:
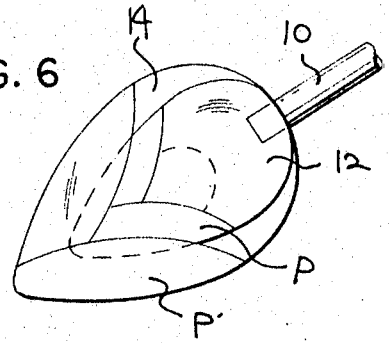
FIGURE 6 is a diagrammatic view showing the application of a second row of colored petals.

In the next step, the body is immersed in the clear glass batch to gather, as indicated on FIG. 5, an additional clear glass layer 14, which covers the colored petals P and then is also shaped to pointed cone form. Subsequently, the body in the form shown in FIG. 6, is again lightly dipped into the colored glass batch in the same manner as above described so as successively to form a second row of petal-like forms P'. The operation is repeated to provide desired number of petal-like forms P' and the artisan can determine the general shape of these according to the angularity of the dip and the extent of dipping.

Figure 7:
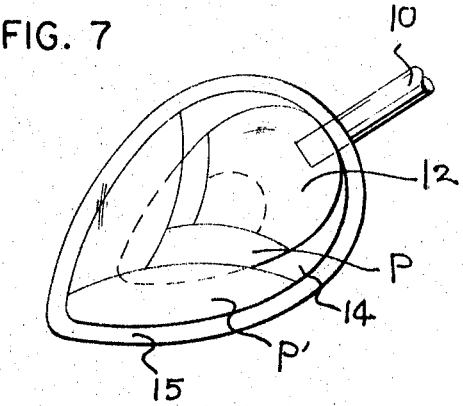
FIGURE 7 is a diagrammatic view showing the next step consisting of applying another coating or layer of clear glass.

After the second row of petal-like forms P' is formed, the body is immersed into the clear batch of glass as indicated in FIG. 7 to provide a clear glass coating 15. To obtain the spherical shape the body is rotated and a wooden block 16 is employed in a well known manner. Shapes other than spherical may be achieved, if desired.

Manifestly, this operation may be repeated as many times as desired according to the number of sets of petal-like forms which are desired. By "petal-like forms" is meant not only the petals of flowers, but leaves or the like, so that the term "petal-like forms" is used in its broadest sense.

The final fininshing of the paperweight, is well known to those skilled in this art. Suffice it to say, that the rod 10 is withdrawn from one side and inserted in the opposite side so that the top of the paperweight will be in desired shape. The opposite end is flattened in order that it will rest in the proper position.

What I claim is:

1. The manufacture of glass paperweights or the like, which consists in gathering a gob of clear glass from a first bath of molten glass to produce a body of less size than that ultimately desired and after working same to pointed cone-like form, dipping the pointed end portion at an inclined angle into a second bath of molten glass of higher temperature than the gob having a selected color to create a petal-like form, then turning the gathering rod after withdrawing the cone from the bath and again dipping into a similar bath of higher temperature than said gob to create another petal-like form adjacent to or partially over-lapping the previous petal-like form, repeating the operation until a minimum of three petal-like forms are obtained encircling said gob, then immersing the cone into a clear glass bath of lower temperature said second bath to form a clear glass layer enclosing the colored petal-like forms, and shaping the body to final form.

2. The manufacture of glass paperweights or the like as claimed in claim 1 in which an additional set of petal-like forms are similarly applied to the layer of clear glass enclosing the first set of petal-like forms while the glass is in cone-like form, and then enclosing said additional forms with a layer of clear class, thus repeating the steps while the glass is in hot plastic condition to create substantially concentric rows or partial rows of forms resembling the petals of a flower.

References Cited

UNITED STATES PATENTS

| | | | |
|---|---|---|---|
| 389,595 | 9/1888 | Reoer | 65—43 |
| 2,538,935 | 1/1951 | Erickson et al. | 65—54 |

S. LEON BASHORE, Primary Examiner

E. R. FREEDMAN, Assistant Examiner

U.S. Cl. X.R.

65—43, 60, 54, 102; 161—28